United States Patent
Goodman et al.

(10) Patent No.: US 9,218,292 B2
(45) Date of Patent: Dec. 22, 2015

(54) LEAST-RECENTLY-USED (LRU) TO FIRST-DIRTY-MEMBER DISTANCE-MAINTAINING CACHE CLEANING SCHEDULER

(71) Applicant: INTERNATIONAL BUSINESS MACHINES CORPORATION, Armonk, NY (US)

(72) Inventors: Benjiman L. Goodman, Cedar Park, TX (US); Jody B. Joyner, Austin, TX (US); Stephen J. Powell, Austin, TX (US); Aaron C. Sawdey, Cannon Falls, MN (US); Jeffrey A. Stuecheli, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 234 days.

(21) Appl. No.: 13/920,756

(22) Filed: Jun. 18, 2013

(65) Prior Publication Data

US 2014/0372704 A1    Dec. 18, 2014

(51) Int. Cl.
*G06F 12/08*    (2006.01)
*G06F 12/12*    (2006.01)

(52) U.S. Cl.
CPC ........ *G06F 12/0891* (2013.01); *G06F 12/0804* (2013.01); *G06F 12/122* (2013.01)

(58) Field of Classification Search
CPC ............ G06F 12/0891; G06F 12/0804; G06F 12/122; G06F 12/123; G06F 12/126; G06F 12/127; G06F 12/128
See application file for complete search history.

(56) References Cited

U.S. PATENT DOCUMENTS

| | | |
|---|---|---|
| 6,490,655 B1 | 12/2002 | Kershaw |
| 6,901,483 B2 | 5/2005 | Robinson et al. |
| 7,620,057 B1 * | 11/2009 | Aloni et al. ................ 370/395.7 |
| 7,689,777 B2 | 3/2010 | Bell, Jr. et al. |
| 7,805,574 B2 | 9/2010 | Bell, Jr. et al. |
| 7,844,778 B2 | 11/2010 | Shen et al. |
| 8,341,358 B1 * | 12/2012 | Edmondson et al. ......... 711/144 |
| 2005/0172082 A1 * | 8/2005 | Liu et al. ...................... 711/144 |
| 2011/0276762 A1 | 11/2011 | Daly et al. |
| 2011/0276763 A1 | 11/2011 | Daly et al. |

\* cited by examiner

*Primary Examiner* — Cheng-Yuan Tseng
*Assistant Examiner* — Rocio Del Mar Perez-Velez
(74) *Attorney, Agent, or Firm* — Mitch Harris, Atty at Law, LLC; Andrew M. Harris; Steven L. Bennett

(57) ABSTRACT

A technique for scheduling cache cleaning operations maintains a clean distance between a set of least-recently-used (LRU) clean lines and the LRU dirty (modified) line for each congruence class in the cache. The technique is generally employed at a victim cache at the highest-order level of the cache memory hierarchy, so that write-backs to system memory are scheduled to avoid having to generate a writeback in response to a cache miss in the next lower-order level of the cache memory hierarchy. The clean distance can be determined by counting all of the LRU clean lines in each congruence class that have a reference count that is less than or equal to the reference count of the LRU dirty line.

11 Claims, 4 Drawing Sheets

LEAST-RECENTLY-USED (LRU) TO FIRST-DIRTY-MEMBER DISTANCE-MAINTAINING CACHE CLEANING SCHEDULER

BACKGROUND OF THE INVENTION

1. Field of the Invention

The present invention is related to processing systems and processors, and more specifically to techniques for scheduling cache cleaning operations based on the distance between the least-recently-used (LRU) line and the first dirty line.

2. Description of Related Art

Cache performance can be improved when periodic flushing of dirty cache lines (i.e., "cache cleaning") is performed. U.S. Patent Application Publication 2011/0276762 discloses a cache cleaner that schedules write bursts by collecting entries in a write queue. The entries are collected by determining if the number of dirty lines present in a congruence class exceeds a threshold and then scheduling write-back of one or more dirty lines if the threshold is exceeded.

While such a scheme will tend to minimize the number of dirty lines present in the cache, depending on actual accesses to lines within each congruence class, and depending on the number of new lines loaded in each congruence class, the cache-cleaning algorithm may still lead to excessive cast-out write-back penalties (waiting on space to be made in a congruence class for one or more new lines that are loaded).

Therefore, it would be desirable to provide a cache controller methodology that can more effectively control cache cleaning operations to provide improved cache performance and reduce the number of write operations issued to system memory.

BRIEF SUMMARY OF THE INVENTION

The invention is embodied in a memory subsystem and cache memory that schedules cache cleaning operations according to a clean line distance. The method is a method of operation of the cache memory control and the processor contains a cache memory operating according to the method.

The cache control logic determines an indication of a number of line allocations that can be supported by the current state of each congruence class without causing a write-back of a dirty line. The control logic compares the indication to a specified clean distance value to determine when to schedule write-backs of dirty lines of the cache memory circuit, and then if write-backs should be scheduled, the control logic schedules the write-backs of one or more of the dirty lines. The clean distance can be determined by counting all of the LRU clean lines in each congruence class that have a reference count that is less than or equal to the reference count of the LRU dirty line.

The foregoing and other objectives, features, and advantages of the invention will be apparent from the following, more particular, description of the preferred embodiment of the invention, as illustrated in the accompanying drawings.

BRIEF DESCRIPTION OF THE SEVERAL VIEWS OF THE DRAWING

The novel features believed characteristic of the invention are set forth in the appended claims. The invention itself, however, as well as a preferred mode of use, further objectives, and advantages thereof, will best be understood by reference to the following detailed description of the invention when read in conjunction with the accompanying Figures, wherein like reference numerals indicate like components, and:

DETAILED DESCRIPTION OF THE INVENTION

The present invention relates to cache memory and memory subsystem including a cache memory, in which background write-back operations are scheduled according to a "clean distance" value that specifies a minimum number of prospective cache victims (cast-out candidates) that are non-dirty (have not been modified). The cache attempts to maintain the clean distance by keeping track of the reference count of the first dirty line and counting the number of clean lines having lower reference counts, and thus will be victimized according to a least-recently used (LRU) replacement algorithm before the dirty line. Since dirty lines must be read (for the write-back operation) and then written over, the performance penalty to victimize a dirty line is higher than that for a clean line, and thus the present invention improves cache performance. If the clean distance is violated for a particular congruence class, background write operations are scheduled for that congruence class to restore the clean distance.

Figure 1:
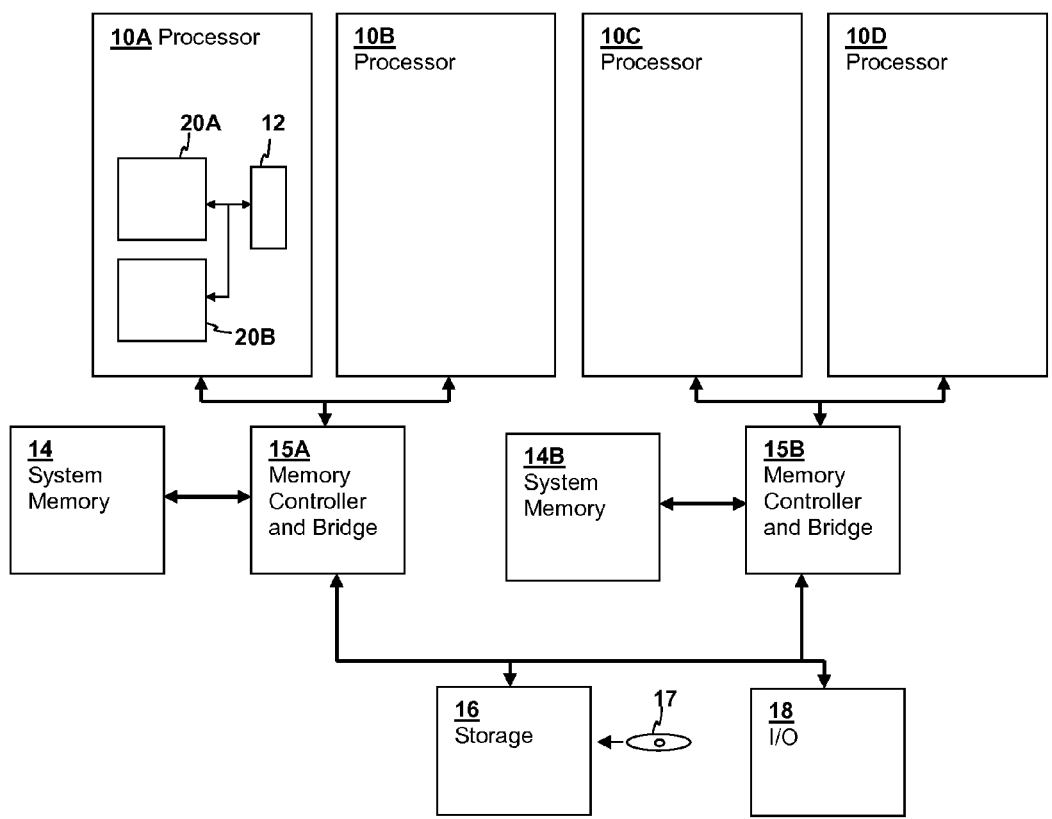
FIG. 1 is a block diagram illustrating a processing system in which techniques according to an embodiment of the present invention are practiced.

Referring now to FIG. 1, a processing system in accordance with an embodiment of the present invention is shown. The depicted processing system includes a number of processors 10A-10D, each coupled to a memory controller/bridge 15A, 15B in conformity with an embodiment of the present invention. The depicted multi-processing system is illustrative, and processing systems in accordance with other embodiments of the present invention include uni-processor systems having symmetric multi-threading (SMT) cores. Processors 10A-10D are identical in structure and include cores 20A-20B and a cache/local storage 12, which may be a cache level, or a level of internal system memory. Processors 10A-10B are coupled to a main system memory 14 by memory controller/bridge 15A, a storage subsystem 16, which includes non-removable drives and optical drives, for reading media such as a CD-ROM 17 forming a computer program product and containing program instructions implementing operating systems and other software for execution by processors 10A-10D, The illustrated processing system also includes input/output (I/O) interfaces and devices 18 such as mice and keyboards for receiving user input and graphical displays for displaying information. Processors 10C-10D are similarly coupled to main system memory 14B, storage subsystem 16, which includes non-removable drives and optical drives, for reading media such as CD-ROM 17, by memory controller/bridge 15B. While the system of FIG. 1 is used to provide an illustration of a system in which the processor architecture of the present invention is implemented, it is understood that the depicted architecture is not limiting and is intended to provide an example of a suitable computer system in which the techniques of the present invention are applied.

Figure 2:
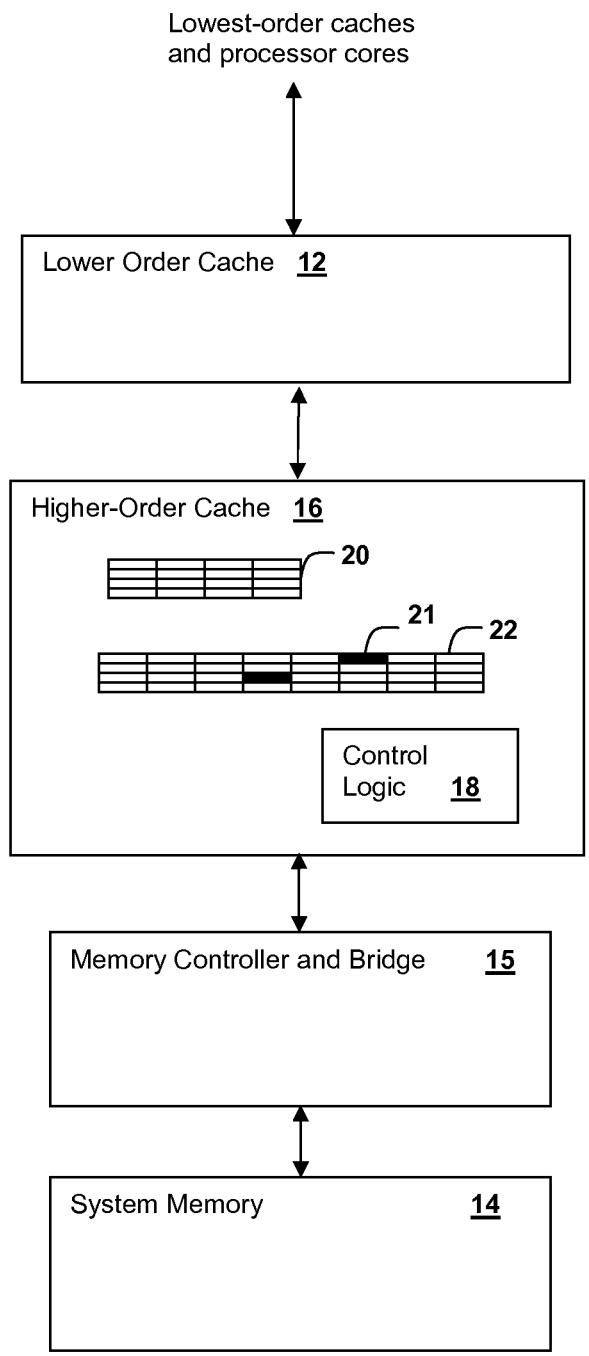
FIG. 2 is a block diagram illustrating details of a memory hierarchy in accordance with an embodiment of the present invention.

Referring now to FIG. 2, a memory hierarchy in accordance with an embodiment of the invention is shown. A lower-order cache 12 is coupled to an even lower-order cache (or a processor core in the case of an L1 cache). Lower-order cache 12 is also coupled to a higher-order cache 16 to which victims (cast-out members) from lower-order cache 12 are written when removed from lower-order cache 12. Higher-order cache 16 includes a control logic 18 that manages accesses to data values stored in a value storage 22 of higher-order cache 16. The locations of the data values are tracked in a directory 20 of higher-order cache 16, which also contains status flags for the various values, which are generally cache lines and reference counts indicating the number of times the data values have been accessed since being loaded into value storage 22. Higher-order cache 16 is coupled to a memory controller, such as a memory controller and bridge 15 that can be used to implement memory controller and bridge units 15A, 15B in the system of FIG. 1. Memory controller and bridge 15 manages accesses to system memory 14 which provides values to and receives values from the lower-order levels of the memory hierarchy as needed.

In general, the exemplary embodiment shown in FIG. 2 is an inclusive hierarchy, with higher-order cache 16 being an inclusive or pseudo-inclusive cache that also serves as a victim cache for lower-order cache 12. However, techniques of the present invention apply to other types of caches and cache hierarchies and the illustrated cache hierarchy is only one example of a cache memory subsystem to which the techniques disclosed herein may apply. Further, any of the caches shown in FIG. 2 may be included in an integrated circuit that contains one or more processor cores to which lower-order cache 12 is coupled, or may be external to the processor core integrated circuit. System memory 14, at least the portion that maps to lines in the remainder of the cache hierarchy, may also be included within an integrated circuit that includes the processor cores, for example in embedded systems, so that the entire mechanism illustrated herein might be implemented within a single integrated circuit, or across multiple integrated circuits. In other terms, the boundary between the processor core can be at the cache level, or the system memory level, and memory controller and bridge 15 that handles the write-backs to system memory 14 from higher-order cache may be located in a processor integrated circuit, or a separate integrated circuit.

Figure 3:
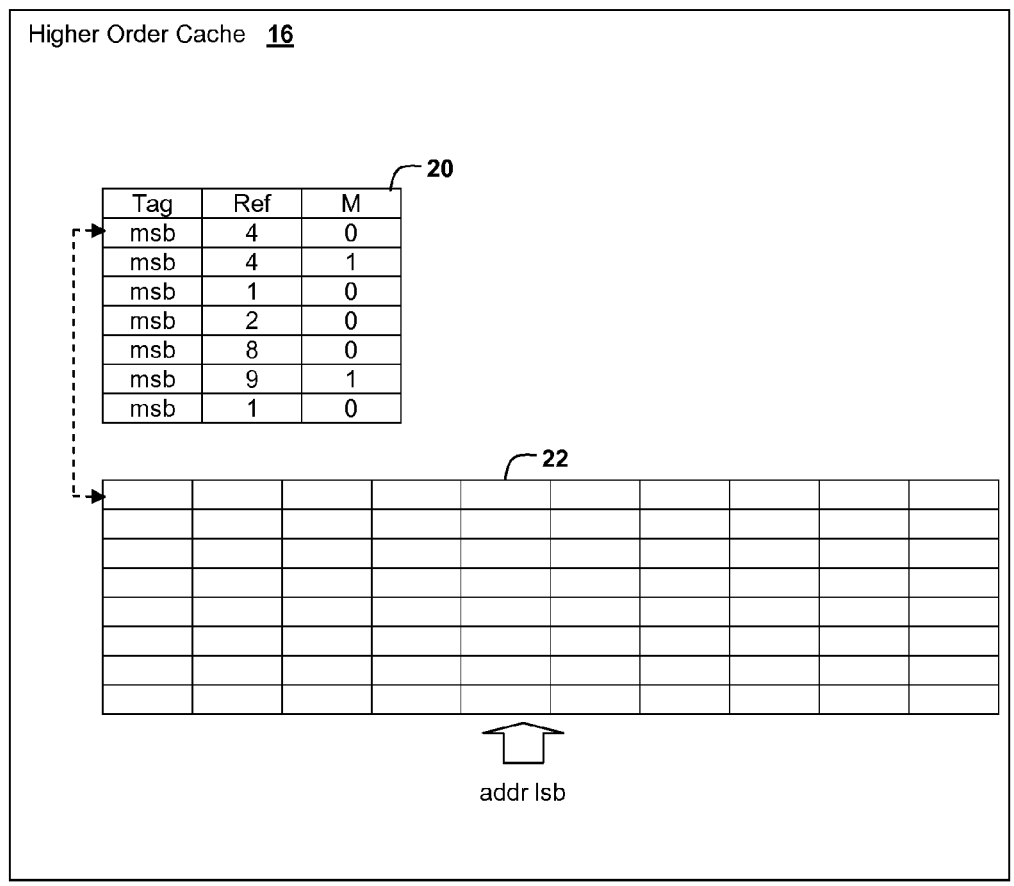
FIG. 3 is a block diagram of a cache memory in accordance with an embodiment of the present invention.

Referring now to FIG. 3, details of higher-order cache 16 are shown, in accordance with an embodiment of the invention. Value storage 22 contains values that are separated into congruence classes, corresponding to the columns of value storage 22, which are selected according to the least significant bits of the address of the values stored in value storage 22. Directory 20 contains entries describing entries in value storage 22, and include a tag field, which is formed from the most-significant bits of the value address, a reference count ref, and flag bits including a modified bit M that indicates whether the particular line is dirty. In the example, only a portion of director 20 is shown that corresponds to a small portion of the actual entries that would be present in a single congruence class of higher-order cache 16. In the example, the dirty lines are those having the modified bit M set equal to a logical "1" state, and the dirty line with the lowest reference count, which is taken as the LRU member, has a reference count of 4. The clean lines, which are those having modified bit M set to zero, can be observed to determine which lines will be victimized before any dirty line, which in the example are the lines with reference counts of 1, 2 and 4. The method of the present invention, as described below, will total those lines, in the example totaling 4, and will compare that total to a clean distance, e.g., five, which, in the example, will cause an indication that at least one of the lines should be written-back to system memory 14, in order to preserve the clean distance in higher-order cache 16.

Figure 4:
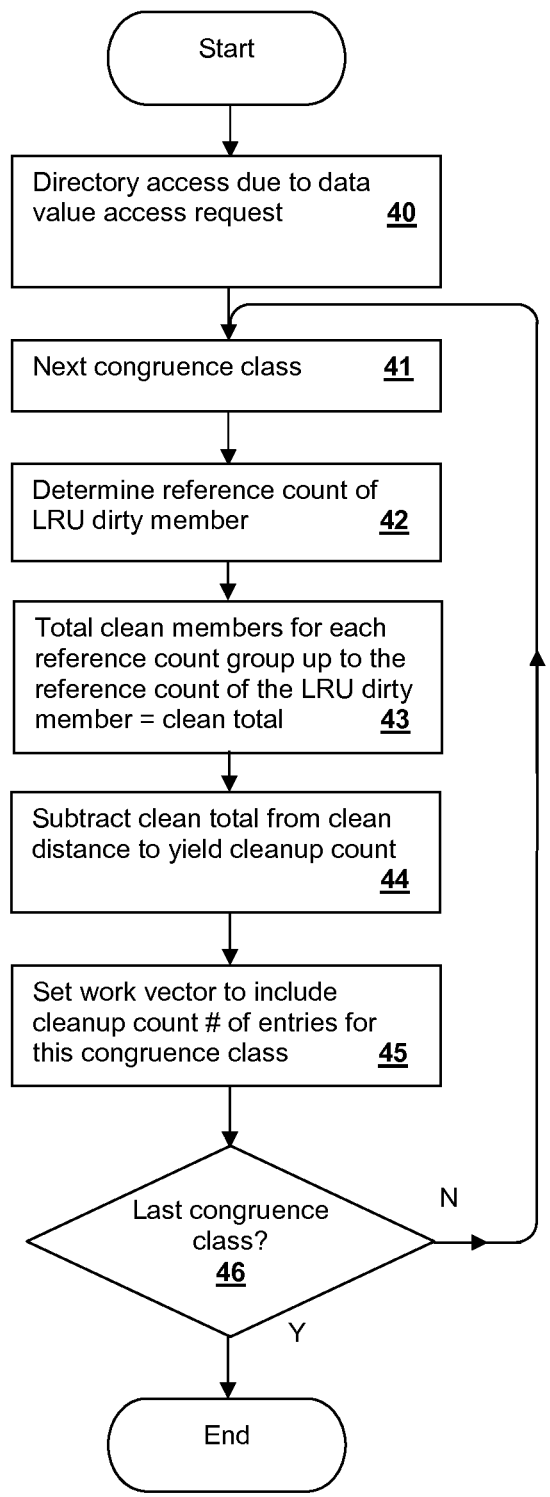
FIG. 4 is a flow chart depicting a method of scheduling cache write-back operations in accordance with an embodiment of the present invention.

Referring now to FIG. 4, a method according to an embodiment of the present invention is depicted a flow chart. When the cache directory is accessed, which occurs when a data value access request is received (step 40), a check is performed, for the congruence class (step 41), to determine whether the clean distance is currently maintained. The exemplary check determines the reference count of the least-recently-used (LRU) dirty member of the class (step 42). The total number of clean members having a reference count less than or equal to the reference count of the LRU dirty member is computed for the congruence class (step 43) and that total is subtracted from the specified clean distance to determine a cleanup count (step 44), if any, that is required to restore the clean distance. The method then sets a work vector to include a cleanup count number of entries, which may be a mechanism that specifies just a number of LRU entries to clean, specifies indices for the specific entries to clean, or provides some other form of vector that can specify a number of entries to clean for each congruence class (step 45). Until the last congruence class has been processed (decision 46), steps 41-45 are repeated for each congruence class. U.S. Patent Application No. US20110276762 "COORDINATED WRITE-BACK OF DIRTY CACHELINES" discloses a write-back scheduling technique that can be used in conjunction with the present invention, and is incorporated herein by reference.

While the invention has been particularly shown and described with reference to the preferred embodiments thereof, it will be understood by those skilled in the art that the foregoing and other changes in form, and details may be made therein without departing from the spirit and scope of the invention.

What is claimed is:

1. A cache memory circuit, comprising:
a plurality of cache line storage locations; and
a control logic that, for each congruence class of the cache memory circuit, determines an indication of a number of line allocations that can be supported by the current state of the congruence class without causing a write-back of a dirty line, wherein the indication is a count of the number of clean cache lines that would be victimized according to a least-recently-used algorithm before the write-back of the dirty line would occur in response to a miss in a next lower-order cache memory, compares the indication to a specified clean distance value to determine when to schedule write-backs of dirty lines of the cache memory circuit, and responsive to determining that write-backs should be scheduled, schedules the write-backs of one or more of the dirty lines.

2. The cache memory circuit of claim 1, wherein the control logic performs the scheduling by generating a cache cleaning vector encompassing all of the congruence classes, specifying dirty lines to flush from the cache memory circuit, and periodically flushing the dirty lines according to the cache cleaning vector.

3. The cache memory circuit of claim 1, wherein the cache memory circuit implements a victim cache that is the highest-order cache of a cache hierarchy, wherein the cache memory circuit flushes the dirty lines to a system memory coupled to the cache memory circuit.

4. The cache memory circuit of claim 1, wherein the control logic determines the indication of a number of line allocations by summing a first number of clean members of the congruence class for each reference count of the least-recently-used algorithm, and determining a total of the first number for each reference count lower than or equal to a reference count of the dirty line as the number of lines that would be victimized in response to the miss in the next lower-order cache memory.

5. The cache memory circuit of claim 1, wherein the specified clean distance value is variable, whereby the clean distance can be varied according to system characteristics.

6. The cache memory circuit of claim 5, wherein the control logic sets the clean distance value according to a measure of write burst delay for a write of one or more cache lines from the cache memory circuit to a system memory.

7. A memory subsystem, comprising:
a system memory;
a cache memory hierarchy comprising a plurality of cache memories each comprising a plurality of cache line storage locations, wherein a highest-order one of the cache memories comprises a control logic that, for each congruence class of the highest-order one of the cache memories, determines an indication of a number of line allocations that can be supported by the current state of the congruence class without causing a write-back of a dirty line, wherein the indication is a count of the number of clean cache lines that would be victimized according to a least-recently-used algorithm before the write-back of the dirty line would occur in response to a miss in a next lower-order one of the plurality of cache memories, compares the indication to a specified clean distance value to determine when to schedule write-backs of dirty lines of the highest-order one of the cache memories, and responsive to determining that write-backs should be scheduled, schedules the write-backs of one or more of the dirty lines.

8. The memory subsystem of claim 7, wherein the control logic performs the scheduling by generating a cache cleaning vector encompassing all of the congruence classes, specifying dirty lines to flush from the highest-order one of the cache memories, and periodically flushing the dirty lines according to the cache cleaning vector.

9. The memory subsystem of claim 7, wherein the control logic determines the indication of the number of line allocations by summing a first number of clean members of the congruence class for each reference count of the least-recently-used algorithm, and determining a total of the first number for each reference count lower than or equal to a reference count of the dirty line as the number of lines that would be victimized in response to the miss in the next lower-order cache memory.

10. The memory subsystem of claim 7, wherein the specified clean distance value is variable, whereby the clean distance can be varied according to system characteristics.

11. The memory subsystem of claim 10, wherein the control logic sets the clean distance value according to a measure of write burst delay for a write of one or more cache lines from the highest-order one of the cache memories to the system memory.

* * * * *